United States Patent
Shimizu et al.

(10) Patent No.: US 8,866,952 B2
(45) Date of Patent: Oct. 21, 2014

(54) DUST REMOVING DEVICE AND IMAGE PICKUP APPARATUS

(71) Applicant: Canon Kabushiki Kaisha, Tokyo (JP)

(72) Inventors: Yasushi Shimizu, Fujisawa (JP); Toshihiro Ifuku, Yokohama (JP); Tatsuo Furuta, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/866,899

(22) Filed: Apr. 19, 2013

(65) Prior Publication Data

US 2013/0286274 A1 Oct. 31, 2013

(30) Foreign Application Priority Data

Apr. 26, 2012 (JP) .................................. 2012-101669

(51) Int. Cl.
| | |
|---|---|
| H04N 5/225 | (2006.01) |
| B60R 1/06 | (2006.01) |
| G02B 27/00 | (2006.01) |
| H04N 5/217 | (2011.01) |

(52) U.S. Cl.
CPC .......... *H04N 5/2254* (2013.01); *G02B 27/0006* (2013.01); *H04N 5/2171* (2013.01)
USPC .......................................... 348/340; 359/507

(58) Field of Classification Search
CPC ............. H04N 5/2171; H04N 1/00909; G02B 27/0006
USPC ............................ 348/335, 340, 374; 359/507
See application file for complete search history.

(56) References Cited

U.S. PATENT DOCUMENTS

| | | | | |
|---|---|---|---|---|
| 7,324,149 | B2* | 1/2008 | Takizawa et al. | 348/340 |
| 7,946,773 | B2* | 5/2011 | Matsumoto | 359/507 |
| 8,107,810 | B2* | 1/2012 | Matsumoto | 359/507 |
| 8,118,500 | B2* | 2/2012 | Kawai | 396/439 |
| 8,180,215 | B2* | 5/2012 | Kawai et al. | 348/335 |
| 8,218,060 | B2* | 7/2012 | Kawai | 348/340 |
| 8,243,184 | B2* | 8/2012 | Kawai | 348/335 |
| 8,351,781 | B2* | 1/2013 | Kawai et al. | 348/335 |
| 8,480,240 | B2* | 7/2013 | Kashiyama | 359/507 |
| 8,482,653 | B2* | 7/2013 | Yoshida | 348/335 |
| 8,514,316 | B2* | 8/2013 | Okazaki et al. | 348/340 |
| 8,562,154 | B2* | 10/2013 | Ohashi | 359/507 |
| 8,605,194 | B2* | 12/2013 | Kawai et al. | 348/335 |

(Continued)

FOREIGN PATENT DOCUMENTS

| | | |
|---|---|---|
| JP | 2004-12474 A | 1/2004 |
| JP | 2006074289 A * | 3/2006 |
| JP | 4724584 B2 | 7/2011 |

*Primary Examiner* — John Villecco

(74) *Attorney, Agent, or Firm* — Canon USA, Inc., IP Division

(57) ABSTRACT

A dust removing device generates vibrations at least at a wavelength $\lambda$ in a vibrating member by applying alternating voltages to a first piezoelectric element and a second piezoelectric element, respectively. The first piezoelectric element is provided on a first surface of the vibrating member that is on a side having a target surface. The second piezoelectric element is provided on a second surface of the vibrating member that is opposite the first surface. When the first piezoelectric element and the second piezoelectric element are projected in a direction that is normal to the target surface, a distance dL1 between a vibration generating end of the first piezoelectric element and a vibration generating end of the second piezoelectric element is expressed in the form dL1>0, where $dL1 \neq n\lambda/2$ and n is a positive integer.

15 Claims, 12 Drawing Sheets

(56) References Cited

U.S. PATENT DOCUMENTS

| | | | |
|---|---|---|---|
| 8,686,618 B2* | 4/2014 | Ohashi et al. | 310/323.18 |
| 2007/0171295 A1* | 7/2007 | Kawai | 348/340 |
| 2010/0220394 A1* | 9/2010 | Kawai | 359/508 |
| 2010/0231780 A1* | 9/2010 | Kawai | 348/335 |
| 2012/0120307 A1* | 5/2012 | Shimada et al. | 348/373 |
| 2012/0188639 A1* | 7/2012 | Urakami et al. | 359/508 |
| 2012/0200922 A1* | 8/2012 | Urakami | 359/507 |
| 2012/0241593 A1* | 9/2012 | Ochi | 250/208.1 |
| 2013/0003096 A1* | 1/2013 | Zhang et al. | 348/335 |
| 2013/0206164 A1* | 8/2013 | Ifuku et al. | 134/1 |
| 2013/0250417 A1* | 9/2013 | Ohashi et al. | 359/507 |
| 2014/0009830 A1* | 1/2014 | Ohashi et al. | 359/507 |
| 2014/0152144 A1* | 6/2014 | Watanabe et al. | 310/311 |

* cited by examiner

DUST REMOVING DEVICE AND IMAGE PICKUP APPARATUS

BACKGROUND OF THE INVENTION

1. Field of the Invention

The present invention relates to a dust removing device and an image pickup apparatus, and particularly to the removal of foreign matter such as dust adhering to a surface of an optical member provided in an image pickup apparatus such as a digital camera or in an image reading apparatus such as a scanner.

2. Description of the Related Art

In an image pickup apparatus such as a digital camera that picks up an image of an object by receiving an optical image of the object and then converting the optical image into an electrical signal, light that is taken thereinto is received by an image pickup device such as a charge-coupled-device (CCD) sensor or a complementary-metal-oxide-semiconductor (CMOS) sensor. The electrical signal (photoelectric conversion signal) is output from the image pickup device, is converted into image data, and is recorded on a recording medium such as a memory card. In such an image pickup apparatus, an optical low-pass filter or an infrared cut filter is provided on the front side (object side) of the image pickup device.

In such an image pickup apparatus, if any pieces of foreign matter such as dust adheres to the surface of a cover glass of the image pickup device, the optical low-pass filter, or the infrared cut filter, the pieces of foreign matter may appear as black spots in a resultant image. Particularly, in a digital single-lens reflex camera including an interchangeable lens, foreign matter such as dust may be taken into the body of the digital camera from the opening of the lens mount when the lens is interchanged with another. Consequently, such foreign matter may adhere to the surface of the cover glass of the image pickup device or the filter.

In this respect, Japanese Patent No. 4724584 and Japanese Patent Laid-Open No. 2004-12474 each disclose a technology in which dust adhering to the surface of a vibrating member such as a cover glass or a filter are removed by deforming the vibrating member in the thickness direction (by exciting vibrations in an out-of-plane bending vibration mode), utilizing the expansion and contraction of piezoelectric elements.

Japanese Patent No. 4724584 discloses a dust removing device that removes, with vibrations, dust adhering to areas around an optical sensor included in a digital camera or a scanner. The dust removing device includes a vibrating plate (vibrating member). A piezoelectric element is fixed to one of two flat surfaces of the vibrating plate. When a voltage is applied to the piezoelectric element, bending vibrations that displace the vibrating plate in the thickness direction are generated, whereby dust that is present in an area (optically effective area) of the surface of the vibrating plate that influences image formation is removed. The amplitude of vibration is insufficient at positions corresponding to the nodes of vibration. Therefore, a plurality of vibration modes are used in the removal of dust in the optically effective area.

Japanese Patent Laid-Open No. 2004-12474 discloses a configuration in which piezoelectric elements are fixed to the front surface and the back surface, respectively, of a transmissive member (vibrating member) that is provided in an image reading apparatus and allows an image of document to be transmitted therethrough. The transmissive member is vibrated by the piezoelectric elements that are fixed to the two surfaces, whereby dust adhering to the transmissive member is removed. In Japanese Patent Laid-Open No. 2004-12474, the contours of the piezoelectric elements on the front and back surfaces of the transmissive member conform to each other when projected in a direction that is normal to the surfaces of the transmissive member.

The dust removing device disclosed by Japanese Patent No. 4724584 employs a method in which the nodes of vibration are shifted by vibrating the piezoelectric element at a plurality of driving frequencies sequentially. Although the order of vibration (the number of nodes of vibration) is changed, the positional shifts of the nodes are small near the piezoelectric element. Consequently, the amplitude of vibration is insufficient.

In the configuration disclosed by Japanese Patent Laid-Open No. 2004-12474 also, the amplitude of vibration near the piezoelectric elements is considered to be insufficient.

SUMMARY OF THE INVENTION

The present invention provides a dust removing device that effectively removes dust by reducing the area where the amplitude of vibration tends to be small, and an image pickup apparatus including the same.

According to an aspect of the present invention, a dust removing device includes at least a first piezoelectric element and a second piezoelectric element each including a piezoelectric material and electrodes provided on the piezoelectric material, and a vibrating member on which the first piezoelectric element and the second piezoelectric element are provided. The dust removing device removes dust from a target surface of the vibrating member by generating vibrations at least at a wavelength $\lambda$ in the vibrating member by applying alternating voltages to the first piezoelectric element and the second piezoelectric element, respectively. The first piezoelectric element is provided on a first surface of the vibrating member that is on a side having the target surface, and the second piezoelectric element is provided on a second surface of the vibrating member that is opposite the first surface. When the first piezoelectric element and the second piezoelectric element are projected in a direction that is normal to the target surface, a distance $dL1$ between a vibration generating end of the first piezoelectric element and a vibration generating end of the second piezoelectric element is expressed in the form $dL1 > 0$, where $dL1 \neq n\lambda/2$ and $n$ is a positive integer.

According to the above aspect of the present invention, the area where the amplitude of vibration tends to be small is reduced in the optically effective area of the vibrating member (dust adhering to the optically effective area may adversely influence a resultant image). Hence, a dust removing device capable of removing dust effectively and an image pickup apparatus including the same are provided.

Further features of the present invention will become apparent from the following description of exemplary embodiments with reference to the attached drawings.

DESCRIPTION OF THE EMBODIMENTS

A dust removing device according to a general embodiment of the present invention includes at least a plurality of piezoelectric elements and a vibrating member. The plurality of piezoelectric elements each include a piezoelectric material and electrodes provided on the piezoelectric material. The vibrating member has a target surface. When alternating voltages are applied to the plurality of piezoelectric elements, respectively, vibrations at least at a wavelength λ are generated in the vibrating member, whereby dust on the target surface of the vibrating member is removed. The plurality of piezoelectric elements include a first piezoelectric element and a second piezoelectric element that are provided on different surfaces of the vibrating member. When the first and second piezoelectric elements are projected in a direction that is normal to the target surface, a distance dL1 between respective vibration generating ends of the first and second piezoelectric elements is expressed in the form dL1>0, where dL1≠nλ/2 and n is a positive integer.

Figure 1:
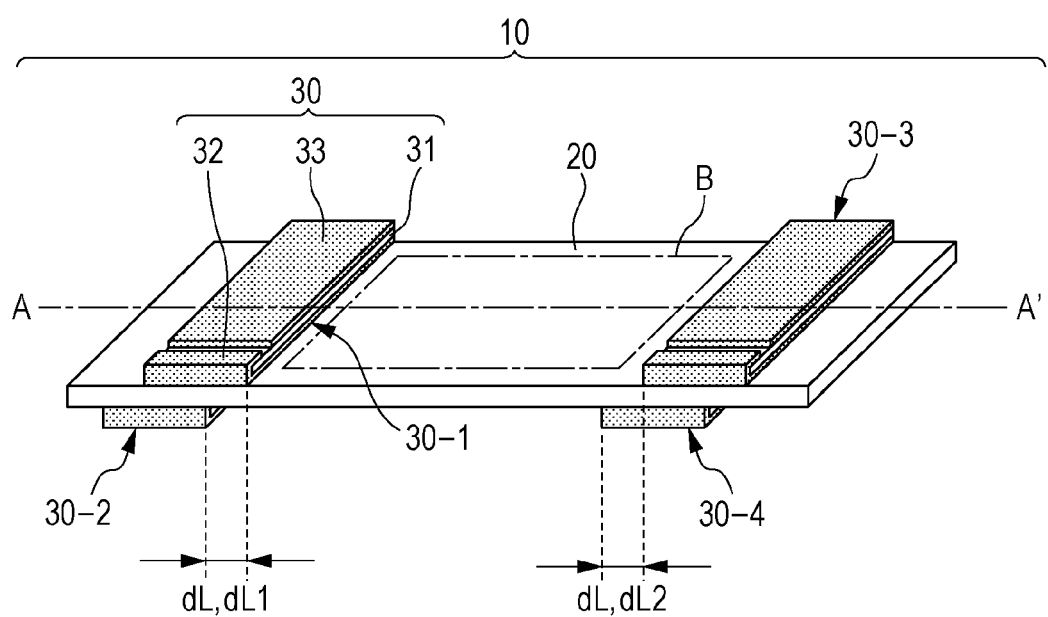
FIG. 1 is a schematic diagram of a dust removing device according to an embodiment of the present invention.

Specific embodiments of the present invention will now be described in detail with reference to the attached drawings.
Configuration of Dust Removing Device FIG. 1 is a schematic diagram of a dust removing device 10 according to a first embodiment of the present invention. The dust removing device 10 according to the first embodiment includes at least a vibrating plate 20, as a vibrating member, and piezoelectric elements 30. When alternating voltages are applied to the respective piezoelectric elements 30, a stress is generated between the vibrating plate 20 and the piezoelectric elements 30, whereby vibrations are generated in the vibrating plate 20. In the dust removing device 10 according to the first embodiment, foreign matter adhering to a target surface B (the area enclosed by a dash-dot line in FIG. 1) of the vibrating plate 20 is removed with the vibrations generated in the vibrating plate 20. Herein, the term "target surface" refers to a surface of the vibrating plate 20 to which dust may adhere in practical use.

The dust removing device 10 includes at least a plate-shaped piezoelectric element 30-1 corresponding to a first piezoelectric element and provided on a first surface of the vibrating plate 20, a plate-shaped piezoelectric element 30-2 corresponding to a second piezoelectric element and provided on a second surface of the vibrating plate 20, and the vibrating plate 20. The dust removing device 10 according to the first embodiment may further include, as to be described below, a plate-shaped piezoelectric element 30-3 corresponding to a third piezoelectric element and provided on the first surface of the vibrating plate 20, and a plate-shaped piezoelectric element 30-4 corresponding to a fourth piezoelectric element and provided on the second surface of the vibrating plate 20. Hereinafter, the piezoelectric elements 30-1 to 30-4 are each denoted as piezoelectric element 30 unless specifically distinguished.

In the first embodiment, the first surface refers to a surface (front surface) of the vibrating plate 20 that is on a side having the target surface B, and the second surface refers to another surface (back surface) of the vibrating plate 20 that is opposite the first surface. When the dust removing device 10 according to the first embodiment is used for optical applications, the vibrating plate 20 is a transparent member or a reflective member.

Each of the piezoelectric elements 30 generates a standing wave (bending vibration) at least at a wavelength λ in the vibrating plate 20 when an external electric field (an alternating voltage) is applied thereto. The wavelength λ is a value specific to the dust removing device 10 and can be designed arbitrarily in accordance with the dimensions and mechanical properties of associated members and the driving frequency. In the first embodiment, the piezoelectric element 30 is provided on the outside of the target surface B (hereinafter also referred to as optically effective area when the dust removing device 10 is used in optical applications) of the vibrating plate 20, and an end of the piezoelectric element 30 that faces the target surface B corresponds to a vibration generating end. In a case where the dust removing device 10 according to the first embodiment is applied to an image pickup apparatus, the optically effective area referred to herein is an area of the vibrating plate 20 through which light that is to be incident on an image pickup device passes. That is, the target surface B according to the first embodiment is an area of the first surface, and the piezoelectric element 30-1 as the first piezoelectric element is provided in an area of the first surface of the vibrating plate 20 that is on the outside of the target surface B. Furthermore, the piezoelectric element 30-2 as the second piezoelectric element is provided in an area of the second surface of the vibrating plate 20 that is on the outside of a projection of the target surface B obtained in a direction that is normal to the target surface B.

Regarding the projections of the piezoelectric element 30-1 and the piezoelectric element 30-2 obtained in the direction that is normal to the target surface B of the vibrating plate 20, the distance (in a direction parallel to the target surface B) between the vibration generating end of the piezoelectric element 30-1 and the vibration generating end of the piezoelectric element 30-2 is denoted as dL1. With the distance dL1, it is avoidable that the nodes of vibration of the standing wave generated in the piezoelectric element 30-1 on the first surface of the vibrating plate 20 and the nodes of vibration of the standing wave generated in the piezoelectric element 30-2 on the second surface of the vibrating plate 20 coincide with each other in the target surface B. The term "nodes of vibration" used herein includes a virtual line connecting the nodes of a standing wave that is generated in the surface of the vibrating plate 20 when the vibrating plate 20 as a vibrating member is vibrated.

If the distance dL1 is larger than 0, an advantageous effect of the present invention of reducing the area where the amplitude of vibration tends to be small is produced. If the distance dL1 is 0 or $n\lambda/2$, where n is a positive integer, the nodes of vibration generated in the first surface of the vibrating plate 20 by the piezoelectric element 30-1 coincide with the nodes of vibration generated in the second surface of the vibrating plate 20 by the piezoelectric element 30-2. Therefore, the dust removal performance is not improved. Hence, in the first embodiment, a condition of dL1>0 is to be satisfied, where dL1≠$n\lambda/2$ and n is a positive integer.

Preferably, with respect to the wavelength $\lambda$ of the standing wave, the distance dL1 may satisfy a condition of $(4n-3)\lambda/8$ dL1 $(4n-1)\lambda/8$, where n is a positive integer. If this condition is satisfied, the dust removal performance is further improved. More preferably, if a condition of dL1=$\lambda/4$ is satisfied, the nodes and loops of vibration generated by the piezoelectric element 30-1 coincide with the loops and nodes, respectively, of vibration generated by the piezoelectric element 30-2. That is, the nodes of vibration generated by the piezoelectric element 30-1 coincide with the loops of vibration generated by the piezoelectric element 30-2. Therefore, dust is more effectively removed over the entirety of the optically effective area.

The dust removing device 10 according to the first embodiment may include all of the piezoelectric elements 30-1 to 30-4 that each generate vibrations at least at a wavelength $\lambda$ in the vibrating plate 20. In that case, the piezoelectric element 30-1 and the piezoelectric element 30-3 are provided on the first surface of the vibrating plate 20, and the piezoelectric element 30-2 and the piezoelectric element 30-4 are provided on the second surface of the vibrating plate 20. In such a case also, the distance dL1 between the vibration generating ends of the respective piezoelectric elements 30-1 and 30-2 in the form of projections obtained in the direction that is normal to the target surface B satisfies the condition of dL1>0, where dL1≠$n\lambda/2$ and n is a positive integer. Furthermore, a distance dL2 between vibration generating ends of the respective piezoelectric elements 30-3 and 30-4 in the form of projections obtained in the direction that is normal to the target surface B may satisfy a condition of dL2>0, where dL2≠$n\lambda/2$ and n is a positive integer. In such a configuration, a standing wave whose amplitude is less damped is generated even in an area of the target surface B that is far from the piezoelectric elements 30.

Preferably, with respect to the wavelength $\lambda$ of the standing wave, the distance dL2 may satisfy a condition of $(4n-3)\lambda/8$ dL2≤$(4n-1)\lambda/8$, where n is a positive integer. If this condition is satisfied, the dust removal performance is further improved. More preferably, if a condition of dL2=$\lambda/4$ is satisfied, the nodes and loops of vibration generated by the piezoelectric element 30-3 provided on the first surface of the vibrating plate 20 coincide with the loops and nodes, respectively, of vibration generated by the piezoelectric element 30-4 provided on the second surface of the vibrating plate 20. Therefore, dust is more effectively removed over the entirety of the optically effective area.

The dimensions and the materials of the piezoelectric elements 30-1 to 30-4 are not necessarily the same. The shape of each of the piezoelectric elements 30 is not limited to a strip shape as illustrated in FIG. 1, and may be a ring shape (doughnut shape) enclosing the target surface B. The distances dL1 and dL2 do not exceed the size of the vibrating plate 20 in a direction in which vibrations are generated (a direction orthogonal to the nodes). That is, the upper limits of the distances dL1 and dL2 are determined by the size of the vibrating plate 20 or the size of the target surface B. Hereinafter, dL1 and dL2 are each denoted as dL unless specifically distinguished.

Configuration of Piezoelectric Element

Figure 2:
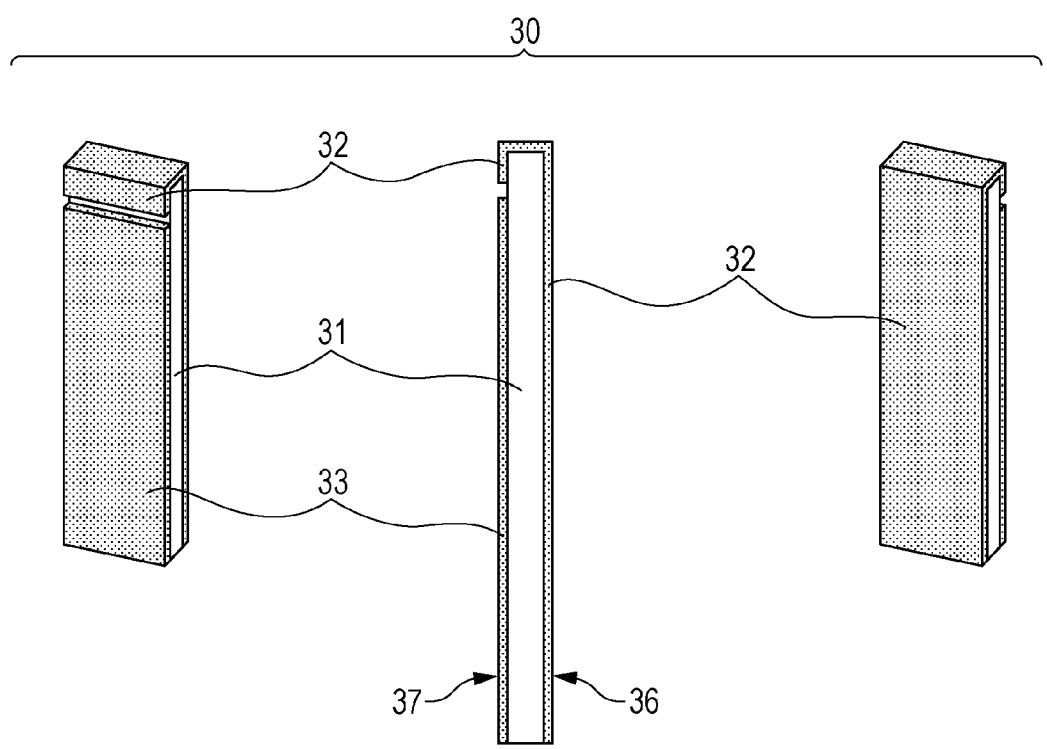
FIG. 2 is a schematic diagram of a piezoelectric element according to the embodiment of the present invention.

FIG. 2 is a schematic diagram of the piezoelectric element 30 according to the first embodiment. As illustrated in FIG. 2, the piezoelectric element 30 includes a piezoelectric material 31, a first electrode 32, and a second electrode 33. The first electrode 32 and the second electrode 33 are provided on respective surfaces of the piezoelectric material 31 in such a manner as to face each other. The piezoelectric material 31 is, for example, piezoelectric ceramic such as lead zirconate titanate (PZT), barium titanate, barium calcium titanate, bismuth sodium titanate, lead titanate, lithium niobate, potassium sodium niobate, or bismuth ferrite, or piezoelectric ceramic chiefly composed of any of the foregoing materials. The piezoelectric material 31 can be chiefly composed of a perovskite-type metal oxide that is expressed by the following general formula:

$$(Ba_{1-x}Ca_x)(Ti_{1-y}Zr_y)O_3 \qquad (1)$$

where $0.02 \le x \le 0.30$, $0.020 \le y \le 0.095$, and $y \le x$.

According to Iwanami Rikagaku Jiten (Dictionary of Physics and Chemistry), Fifth Edition (Iwanami Shoten, published on Feb. 20, 1998), the term "perovskite-type metal oxide" refers to a metal oxide having a perovskite structure that is ideally a cubic crystal system. Metal oxides having perovskite structures are each in general expressed by a chemical formula of $ABO_3$. In a perovskite-type metal oxide, the elements A and B are in the form of ions and occupy specific positions of a space lattice that are called site A and site B, respectively. For example, in the space lattice of a cubic crystal system, the element A is at each of the vertices of the cube, the element B is at the body center, and the element O as an anion of oxygen is at each of the face centers of the cube.

In the metal oxide expressed by General Formula (1), metallic elements at the site A correspond to Ba and Ca, and metallic elements at the site B correspond to Ti and Zr. Note that some of Ba and Ca may be at the site B, and some of Ti and Zr may be at the site A.

The molar ratio of the element at the site B to the element O in General Formula (1) is 1:3. Any molar ratios that vary slightly from 1:3 (for example, 1.00:2.94 to 1.00:3.06) are within the scope of the present invention, as long as the main phase of the metal oxide has a perovskite structure.

Whether or not the metal oxide has a perovskite structure is determined by, for example, structural analysis based on X-ray diffraction or electron diffraction.

In General Formula (1), x denoting the molar ratio of Ca at the site A falls within a range of $0.02 \le x \le 0.30$. If x is smaller than 0.02, dielectric loss (tan δ) increases. If dielectric loss increases, heat generated when the piezoelectric element 30 is driven with a voltage applied thereto may increase, resulting in a possible reduction in the driving efficiency. If x is larger than 0.30, the piezoelectric characteristic may be insufficient.

In General Formula (1), y denoting the molar ratio of Zr at the site B falls within a range of $0.020 \le y \le 0.095$. If y is smaller than 0.020, the piezoelectric characteristic may be insufficient. If y is larger than 0.095, the Curie temperature (Tc) becomes as low as below 85° C. In such a case, the piezoelectric characteristic may be lost in a high temperature range.

Herein, the term "Curie temperature" refers to a temperature at which ferroelectricity is lost. Curie temperature is identified as follows. The temperature at which ferroelectricity is lost is directly measured by varying the temperature to be measured. Alternatively, the temperature at which the dielectric constant becomes maximum is measured by using a weak alternating electric field and by varying the temperature to be measured. Thus, the Curie temperature is identified.

In General Formula (1), the molar ratio x of Ca and the molar ratio y of Zr are in a relationship of y≤x. If y>x, dielectric loss increases or the insulating characteristic is insufficient. If the ranges of x and y defined above are satisfied simultaneously, phase transition temperature T can be changed from a temperature near room temperature to the operating temperature or below, enabling the piezoelectric element 30 to operate stably in a wide temperature range.

Regarding General Formula (1), $A_1/B_1$ denoting the ratio of the molar quantity of Ba and Ca at the site A to the molar quantity of Ti and Zr at the site B can be set within a range of $1.00 \leq A_1/B_1 \leq 1.01$. If $A_1/B_1$ is smaller than 1.00, abnormal grain growth tends to occur, reducing the mechanical strength of the piezoelectric material 31. If $A_1/B_1$ is larger than 1.01, heat that is necessary for grain growth becomes too high. In such a case, a sufficiently high density may not be obtained with a typical kiln, or many pores or defects may occur in the piezoelectric material 31.

The method of measuring the composition of the piezoelectric material 31 is not specifically limited and may be any of X-ray fluoroscopy (XRF), inductively-coupled-plasma (ICP) spectroscopy, atomic absorption spectroscopy, and the like.

In any of the methods, the ratios by weight and by composition of elements contained in the piezoelectric material 31 are calculable.

The piezoelectric material 31 is chiefly composed of the perovskite-type metal oxide expressed by General Formula (1). The perovskite-type metal oxide contains Mn. On a metal basis, the content of Mn can be set to 0.02 parts by weight or greater and 0.40 parts by weight or less per 100 parts by weight of the metal oxide.

If the metal oxide contains Mn by the above range, the insulating characteristic and a mechanical quality factor Qm are improved. The mechanical quality factor Qm represents elastic loss due to vibrations when the piezoelectric element 30 is evaluated as a vibrator. The value of the mechanical quality factor Qm corresponds to the sharpness of a resonance curve observed in the measurement of impedance. That is, the mechanical quality factor Qm is a constant that represents the sharpness of the resonance of the piezoelectric element 30. If the mechanical quality factor Qm is large, the amount of strain in the piezoelectric element 30 is larger at frequencies near the resonance frequency of the piezoelectric element 30, causing the piezoelectric element 30 to effectively vibrate.

The improvements in the insulating characteristic and in the mechanical quality factor Qm are considered to be realized because a defect dipole is formed by Mn having a valence number that is different from those of Ti and Zr, and thus an internal electric field is produced. If any internal electric field is present, the reliability of the piezoelectric element 30 that is driven with a voltage applied thereto is assuredly provided.

On a metal basis, the content of Mn is obtained as follows. The contents of metals Ba, Ca, Ti, Zr, and Mn in the piezoelectric material 31 are measured by XRF, ICP spectroscopy, atomic absorption spectroscopy, or the like. On the basis of the measured contents, elements composing the metal oxide expressed by General Formula (1) are expressed on an oxide basis. Then, the ratio of the weight of Mn to the total weight of the elements that is defined as 100 is taken as the content of Mn on a metal basis.

If the content of Mn is less than 0.02 parts by weight, the effect of polarization that is necessary for driving the piezoelectric element 30 is insufficient. If the content of Mn exceeds 0.40 parts by weight, the piezoelectric characteristic is insufficient. Moreover, hexagonal crystals that do not contribute to the piezoelectric characteristic are formed.

The form of Mn is not limited to metal. That is, Mn only needs to be contained in the piezoelectric material 31 regardless of its form. For example, Mn may be dissolved at the site B, may be at a grain boundary, or may be contained in the piezoelectric material 31 in any form such as metal, ion, oxide, metallic salt, or complex. In terms of insulation and easiness of sintering, Mn may be dissolved at the site B. In the case where Mn is dissolved at the site B, letting the ratio of the molar quantity of Ba and Ca at the site A to the molar quantity of Ti, Zr, and Mn at the site B be $A_2/B_2$, the ratio $A_2/B_2$ can be set within a range of $0.993 \leq A_2/B_2 \leq 0.998$. If the ratio $A_2/B_2$ in the piezoelectric element 30 falls within this range, the piezoelectric element 30 expands and contracts more in the longitudinal direction thereof and has a large mechanical quality factor. Consequently, the dust removing device 10 exhibits superior dust removal performance and superior durability.

The piezoelectric material 31 may contain other components (hereinafter referred to as accessory components) in addition to those defined by General Formula (1) and Mn unless the characteristics of the piezoelectric material 31 are not changed. The total quantity of accessory components can be set to less than 1.2 parts by weight per 100 parts by weight of the metal oxide expressed by General Formula (1). If the quantity of accessory components exceeds 1.2 parts by weight, the piezoelectric characteristic and the insulating characteristic of the piezoelectric material 31 may be deteriorated. The content of metallic elements included in the accessory components other than Ba, Ca, Ti, Zr, and Mn can be set to 1.0 parts by weight or less on an oxide basis or 0.9 parts by weight or less on a metal basis per 100 parts by weight of the piezoelectric material 31. The metallic elements referred to herein include semimetallic elements such as Si, Ge, and Sb. If the content of metallic elements included in the accessory components other than Ba, Ca, Ti, Zr, and Mn exceeds 1.0 parts by weight on an oxide basis or 0.9 parts by weight on a metal basis per 100 parts by weight of the piezoelectric material 31, the piezoelectric characteristic and the insulating characteristic of the piezoelectric material 31 may be deteriorated significantly. The total quantity of Li, Na, Mg, and Al included in the accessory components can be set to 0.5 parts by weight or less on a metal basis per 100 parts by weight of piezoelectric material 31. If the total quantity of Li, Na, Mg, and Al included in the accessory components exceeds 0.5 parts by weight on a metal basis per 100 parts by weight of the piezoelectric material 31, the piezoelectric material 31 may not be sintered sufficiently. The total quantity of Y and V included in the accessory components can be set to 0.2 parts by weight or less on a metal basis per 100 parts by weight of the piezoelectric material 31. If the total quantity of Y and V included in the accessory components exceeds 0.2 parts by weight on a metal basis per 100 parts by weight of the piezoelectric material 31, polarization may be difficult.

Exemplary accessory components include sintering aids such as Si, Cu, and B. The piezoelectric material 31 according to the first embodiment may contain Sr and Mg of respective quantities that are inevitably contained in commercially available raw materials for Ba and Ca. Likewise, the piezoelectric material 31 according to the first embodiment may contain Nb of a quantity that is inevitably contained in commercially available raw materials for Ti, and Hf of a quantity that is inevitably contained in commercially available raw materials for Zr.

The method of measuring the parts by weight of accessory components is not specifically limited and may be any of XRF, ICP spectroscopy, atomic absorption spectroscopy, and the like.

The piezoelectric element 30 has the first electrode 32 on a first electrode surface 36 thereof and the second electrode 33 on a second electrode surface 37 thereof. Sensor electrodes (not illustrated) that each read the voltage generated and detect the amplitude and the phase of vibration may be added. As illustrated in FIG. 2, the first electrode 32 may extend over a portion of the second electrode surface 37. The electrodes 32 and 33 are each obtained by patterning a conductive thin film formed of common conductive paste or the like or a conductive thin film formed by sputtering, deposition, or the like. The piezoelectric element 30 is used after a high voltage is applied to the electrodes 32 and 33 and the electrodes 32 and 33 are thus polarized. The physical properties and the dimensions of the piezoelectric material 31, the method of forming the electrodes 32 and 33, and the patterns of the electrodes 32 and 33 may be selected considering the configuration, the dust removal performance, the manufacturing costs, and so forth of the dust removing device 10.

The piezoelectric element 30 is fixed to the surface of the vibrating plate 20 at the first electrode surface 36 thereof with epoxy-resin adhesive or the like. The adhesive can be selected from those whose bonding strength is not reduced in an operating temperature range of the dust removing device 10 and that do not adversely influence the characteristics of the dust removing device 10 in the operating temperature range.

Image Pickup Apparatus and Image Reading Apparatus

Other embodiments of the present invention concerning an image pickup apparatus and an image reading apparatus each including the dust removing device will now be described.

An image pickup apparatus according to a second embodiment of the present invention includes at least the dust removing device 10 according to the first embodiment and an image pickup unit. The vibrating plate 20, as a vibrating member, of the dust removing device 10 and a light receiving surface of the image pickup unit are provided coaxially in that order.

Figure 3A:
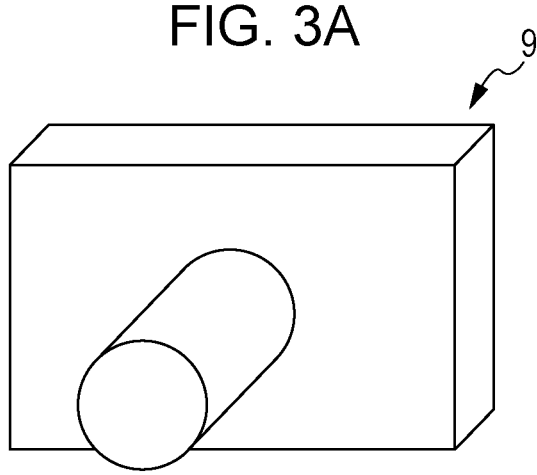
FIG. 3A is a schematic diagram of an exemplary image pickup apparatus including the dust removing device according to the embodiment of the present invention.
Figure 3B:
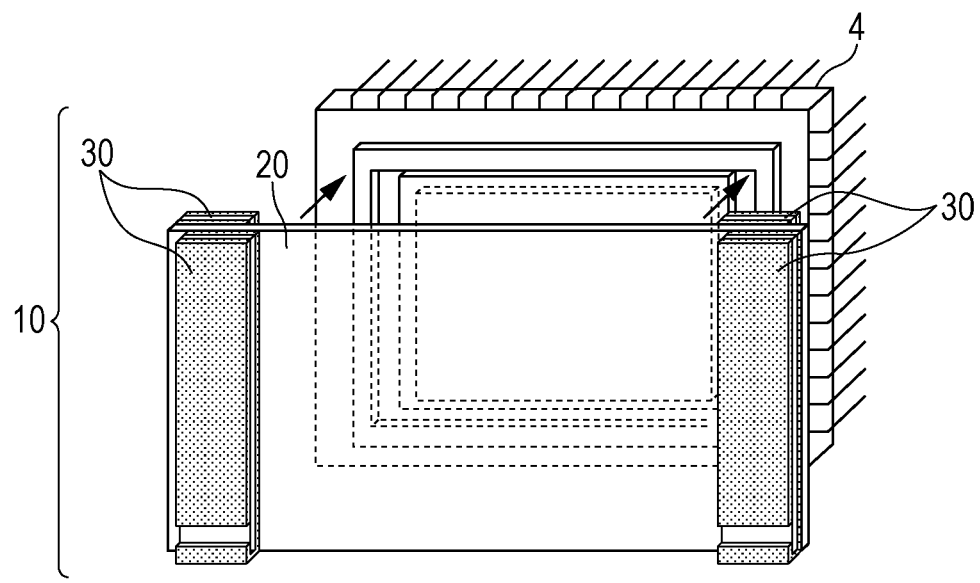
FIG. 3B is a schematic diagram of an exemplary image pickup unit included in the image pickup apparatus.

FIG. 3A is a perspective view illustrating the appearance of a camera 9 as an image pickup apparatus. The camera 9 is a known digital still camera. FIG. 3B is a perspective view illustrating a configuration of the image pickup unit of the camera 9 that includes the dust removing device 10. The image pickup unit of the camera 9 includes an image pickup device 4 as a light receiving element, such as a charge-coupled-device (CCD) sensor or a complementary-metal-oxide-semiconductor (CMOS) sensor. The image pickup device 4 receives an optical image of an object and converts the optical image into an electrical signal, thereby generating image data. The vibrating plate 20, having a rectangular plate shape, is attached to the image pickup device 4 in such a manner as to seal a space provided on the front side of the image pickup device 4.

The vibrating plate 20 is a highly transmissive optical member such as a cover glass, an infrared cut filter, or an optical low-pass filter. Light transmitted through the vibrating plate 20 is incident on the light receiving surface of the image pickup device 4. That is, the vibrating plate 20 and the light receiving surface of the image pickup device 4 are provided coaxially. With the vibrating plate 20 provided near the image pickup unit and in front of the light receiving surface, adverse influences of dust upon an image to be formed are effectively reduced. When the camera 9 is used, the light receiving surface of the image pickup unit is at an angle close to a vertical angle (oriented in a direction in which the gravitational force acts). In such an orientation, dust on the vibrating plate 20 tends to fall from the vibrating plate 20 with vibrations.

The dimensions of piezoelectric elements 30 provided at the two ends of the vibrating plate 20 are adjustable in accordance with the physical properties of the piezoelectric materials of the piezoelectric elements 30 and the vibrating plate 20 such that a force that causes bending deformation with vibrations becomes large. The adjustment needs to be done optimally considering the overall configuration, the dust removal performance, and the manufacturing costs of the camera 9 as an image pickup apparatus.

Figure 4:
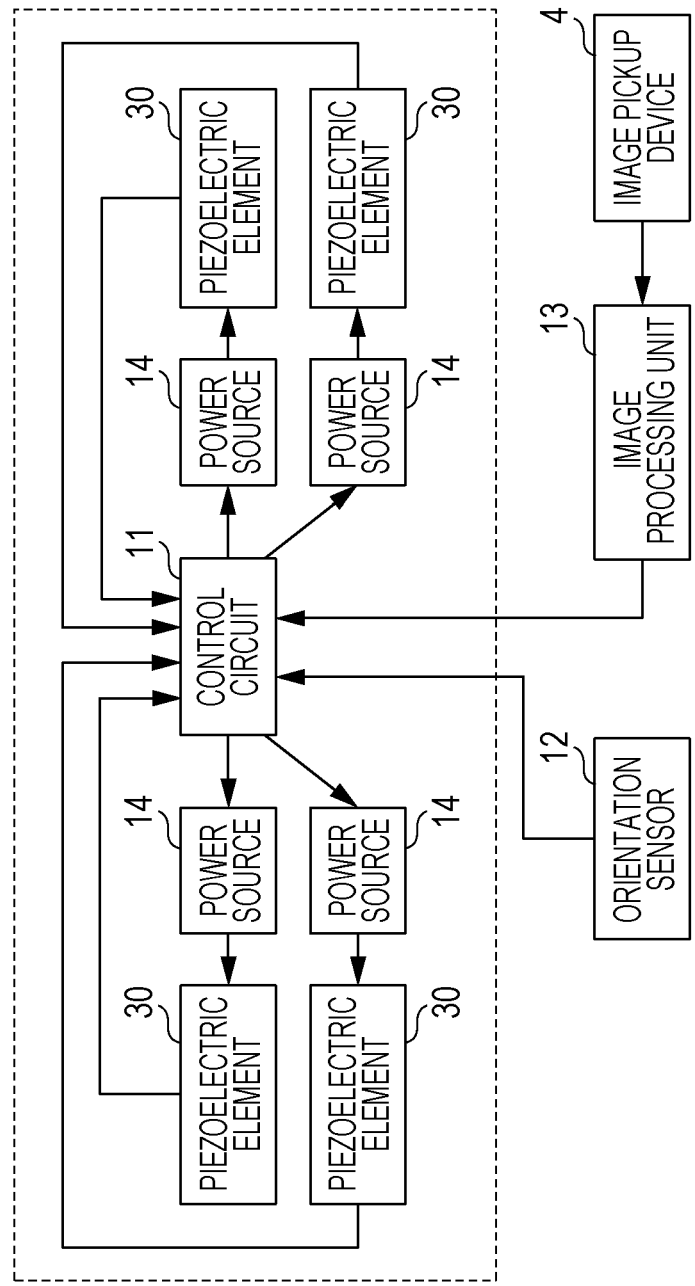
FIG. 4 is an exemplary block diagram illustrating an electrical configuration of the dust removing device according to the embodiment of the present invention.

FIG. 4 is a block diagram illustrating an electrical configuration of the dust removing device 10 in a case where the dust removing device 10 includes sensor electrodes. A block enclosed by a dotted line corresponds to the dust removing device 10. The dust removing device 10 includes power sources 14, a control circuit 11, and the piezoelectric elements 30. In the configuration illustrated in FIG. 4, a combination of the power sources 14 and the control circuit 11 functions as a control unit. The control circuit 11 detects the amplitudes and the phases of vibration of the piezoelectric elements 30 by reading the voltages generated, with piezoelectric effects, in the sensor electrodes (not illustrated) of the piezoelectric elements 30, thereby controlling the amplitudes, the frequencies, and the temporal phases of the alternating voltages to be generated by the power sources 14.

In the second embodiment, an orientation sensor 12 and an image processing unit 13 are connected to the control circuit 11. The image processing unit 13 is connected to the image pickup device 4. The orientation sensor 12 detects the orientation of the dust removing device 10 (specifically, the orientation of the target surface of the vibrating plate 20). The image processing unit 13 calculates to which positions of the target surface pieces of dust have adhered by using an image taken by the image pickup device 4. The power sources 14 apply alternating voltages to the respective piezoelectric elements 30.

Figure 5:
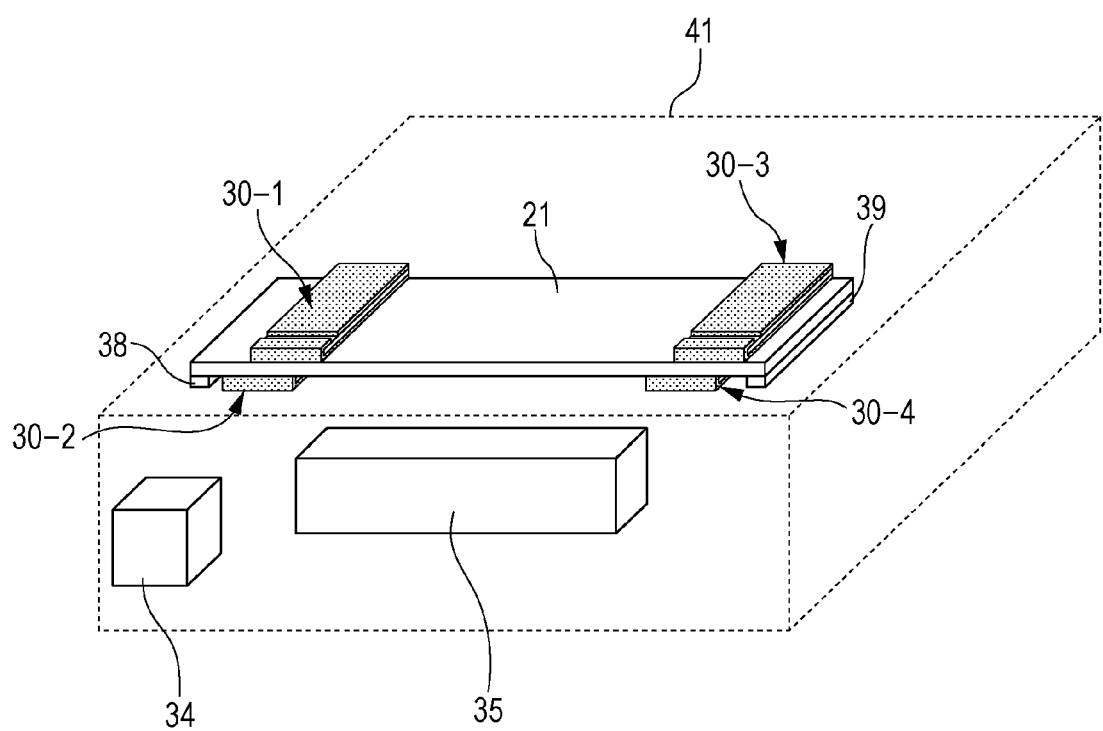
FIG. 5 is a schematic diagram of an exemplary image reading apparatus including the dust removing device according to the embodiment of the present invention.

A third embodiment of the present invention concerning an image reading apparatus including a dust removing device will now be described. FIG. 5 is a perspective view illustrating a configuration of a dust removing device included in a copier as an image reading apparatus according to the third embodiment.

Referring to FIG. 5, the copier includes, in a housing 41 of an image reading unit (a reader unit), an optical element 21, a scanner unit (photoelectric conversion device) 35, and the dust removing device. The dust removing device includes a first piezoelectric element 30-1, a second piezoelectric element 30-2, a third piezoelectric element 30-3, a fourth piezoelectric element 30-4, supporting members 38 and 39, a driving circuit 34, and the optical element 21. The driving circuit 34 and the piezoelectric elements 30 are connected to each other with wires (not illustrated). In the configuration illustrated in FIG. 5, the driving circuit 34 functions as a control unit.

In the third embodiment, the optical element 21 is used as the vibrating member of the dust removing device. The optical element 21 is an optical member made of glass or the like and has a plate shape (rectangular shape). The piezoelectric elements 30 are fixed to the flat surfaces of the optical element 21 with adhesive or the like. The piezoelectric elements 30 each have electrodes on the surfaces thereof (details are not illustrated), as with the piezoelectric element 30 illustrated in FIG. 2.

The supporting members 38 and 39 are elastic members made of felt, foamed resin, rubber or the like and each have a stick shape. The supporting members 38 and 39 are fixed to the optical element 21 and to the housing 41 with adhesive. The optical element 21 is thus supported by the housing 41 with the supporting members 38 and 39 interposed therebetween. The scanner unit 35 is provided below the optical element 21. The scanner unit 35 includes an optical sensor (not illustrated) thereinside. In copying, light reflected by document that is transported by a transport mechanism (not illustrated) in a state where the document is in contact with the optical element 21 is transmitted through the optical element 21, and the light is formed into an image by the optical sensor provided in the scanner unit 35. Thus, information on the image of the document is read as image data. The driving circuit 34 applies alternating voltages (driving signals) to the respective piezoelectric elements 30, thereby vibrating the optical element 21.

Driving Method

A method of driving the dust removing device according to any of the above embodiments of the present invention will now be described, beginning with the relationship between the distance dL in the dust removing device 10 illustrated in FIG. 1 and the amplitude of vibration in the vibrating plate 20 measured along a line A-A' (a typical vibration measurement line) passing through the target surface B (optically effective area) enclosed by the dash-dot line.

A case where the dust removing device 10 illustrated in FIG. 1 is configured such that $dL=\lambda/4$ will be taken as an example. When the control unit applies alternating voltages at certain frequencies to the respective piezoelectric elements 30 and thus drives the dust removing device 10 illustrated in FIG. 1 at a resonance frequency, vibrations at a certain wavelength are generated in the vibrating plate 20. The wavelength is denoted as $\lambda$. In this case, errors in the distance dL of about ±5% do not significantly influence the advantageous effect of the present invention. Hence, errors of about ±5% are allowed.

Control operations performed by the control unit according to any of the embodiments of the present invention will now be described in detail. In a first control operation, a removal driving operation A is performed in which alternating voltages that are at the same frequency (a first frequency) with a phase difference of 0 (the voltages are in phase) are applied to the piezoelectric element 30-1 and the piezoelectric element 30-3. In a second control operation, a removal driving operation B is performed in which alternating voltages that are at the same frequency (the first frequency) with a phase difference of 0 (the voltages are in phase) are applied to the piezoelectric element 30-2 and the piezoelectric element 30-4. In a third control operation, a removal driving operation C is performed in which alternating voltages that are at the same frequency (the first frequency) with a phase difference of $\pi$ (=180°, that is, the voltages are in opposite phases) are applied to the piezoelectric element 30-1 and the piezoelectric element 30-3. In a fourth control operation, a removal driving operation D is performed in which alternating voltages that are at the same frequency (the first frequency) with a phase difference of $\pi$ (the voltages are in opposite phases) are applied to the piezoelectric element 30-2 and the piezoelectric element 30-4.

Figure 12:
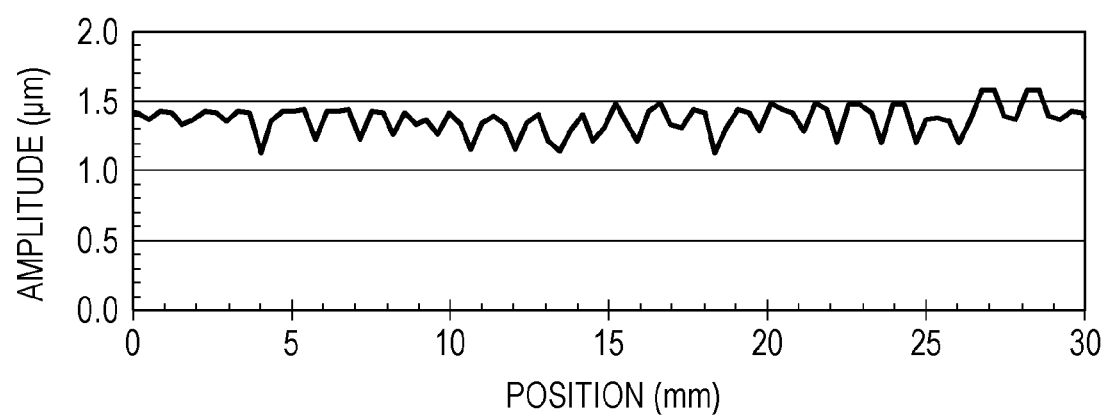
FIG. 12 is a graph illustrating an exemplary measured amplitude of vibration generated on a vibration measurement line defined in the dust removing device according to the embodiment of the present invention.

FIG. 12 is a graph illustrating the amount of displacement (amplitude of vibration) observed on the vibration measurement line A-A' when the removal driving operation A, the removal driving operation B, the removal driving operation C, and the removal driving operation D are performed successively (sequentially at different timings). The graph in FIG. 12 illustrates the largest amplitude of vibration at each of different positions observed when all of the removal driving operations A to D are performed. The amplitude of vibration is measurable by, for example, scanning the surface of the vibrating plate 20 along the vibration measurement line A-A' with a laser Doppler vibrometer (of the LV-1700 series from Ono Sokki). In the dust removing device 10, the larger the amplitude of vibration, the better the dust removal performance. In the first embodiment illustrated in FIG. 1, if the amplitude of vibration is 0.3 μm or larger, 95% or more of any pieces of dust are removable. If the amplitude of vibration is 0.8 μm or larger, the dust removal performance is further improved and nearly 100% of any pieces of dust are removable.

The order of performing the removal driving operations A to D is arbitrary. In the above method, a bending vibration mode of the nineteenth order occurs when the dust removing device 10 is driven with a phase difference of 0, whereas a bending vibration mode of the eighteenth order occurs when the dust removing device 10 is driven with a phase difference of $\pi$. The present invention is not limited to such a case. Other vibration modes may be excited. In the above method, when a plurality of vibration modes are used, the distance dL is determined on the basis of the wavelength $\lambda$ of a high-order vibration mode. Depending on the physical properties and the dimensions of members employed in the dust removing device 10 and members that support the dust removing device 10, however, the distance dL may be determined on the basis of the wavelength $\lambda$ of a low-order vibration mode. The present invention is not limited to an embodiment in which a plurality of vibration modes are generated. The arrangement of the piezoelectric elements 30 according to each of the embodiments of the present invention effectively shifts the positions of nodes. Hence, if at least one vibration mode is generated, the advantageous effect of the present invention is produced successfully.

In each of the embodiments of the present invention, the third and fourth piezoelectric elements may be omitted, that is, the dust removing device is operable with at least the first and second piezoelectric elements. In a case of a dust removing device 10 illustrated in FIG. 6 that includes two piezoelectric elements 30-1 and 30-2, the piezoelectric element 30-1 and the piezoelectric element 30-2 can be driven sequentially, not synchronously. Specifically, the control unit may apply alternating voltages at the same frequency to the first and second piezoelectric elements at different timings (typically, the voltages may be applied to the first and second piezoelectric elements in that order). Alternatively, the control unit may apply alternating voltages at different frequencies to the first and second piezoelectric elements at different timings (typically, the voltages may be applied to the first and second piezoelectric elements in that order).

EXAMPLES

Configurations and driving operations according to working examples and comparative examples of the present invention will now be described. The dust removing device according to the present invention is not limited to those according to the following working examples.

Working Example 1

A dust removing device 10 configured as illustrated in FIG. 1 was prepared by using a vibrating plate 20 that was a glass plate functioning as an infrared cut filter and of size 50.8 mm (width)×33.7 mm (length)×0.3 mm (thickness) and piezoelectric elements 30 each made of PZT having a material code NA manufactured by Nihon Ceratec Co., Ltd. (with Ag-paste electrodes, polarized) and being of size 33.3 mm×4.0 mm×0.25 mm. The piezoelectric elements 30 were fixed at the positions illustrated in FIG. 1 with epoxy-resin-based adhesive applied in the longitudinal direction, corresponding to the length of 33.7 mm, of the vibrating plate 20. The piezoelectric elements 30 were arranged on the vibrating plate 20 such that the distances dL fell within a range of λ/4±3%, where λ denotes the wavelength of vibration generated at the resonance frequency of the piezoelectric elements 30. In Working Example 1, dL=dL1=dL2, and the optically effective area (target surface B enclosed by the dash-dot line) had a width of 30 mm or larger.

Alternating voltages of ±20 V were applied to the piezoelectric elements 30. The frequencies of the alternating voltages were set within a range of 106.5±10 kHz in a case where a bending vibration mode of the eighteenth order was to be generated and within a range of 116.5±10 kHz in a case where a bending vibration mode of the nineteenth order was to be generated. Here, as described above, a control operation in which the phase difference between the alternating voltages applied to the piezoelectric element 30-1 and the piezoelectric element 30-3 was 0 (the alternating voltages were in phase) is referred to as removal driving operation A, a control operation in which the phase difference between the alternating voltages applied to the piezoelectric element 30-2 and the piezoelectric element 30-4 was 0 is referred to as removal driving operation B, a control operation in which the phase difference between the alternating voltages applied to the piezoelectric element 30-1 and the piezoelectric element 30-3 was π (the alternating voltages were in opposite phases) is referred to as removal driving operation C, and a control operation in which the phase difference between the alternating voltages applied to the piezoelectric element 30-2 and the piezoelectric element 30-4 was π is referred to as removal driving operation D. The removal driving operations A to D were performed sequentially, whereby the vibrating plate 20 was driven at resonance frequencies corresponding to the respective conditions. When the phase difference was 0, a bending vibration mode of the nineteenth order was generated. When the phase difference was π, a bending vibration mode of the eighteenth order was generated. The amplitude of vibration was measured by scanning the surface of the vibrating plate 20 with a laser Doppler vibrometer.

The dust removal performance was evaluated in a state where the dust removing device 10 was provided in the apparatus illustrated in FIGS. 3A and 3B and by sequentially performing the removal driving operations A to D under the respective conditions by using an external power source instead of the circuit illustrated in FIG. 4. In each of the removal driving operations A to D, the frequency of the alternating voltages was swept once over a range of the resonance frequency ±10 kHz. The dust removal performance was evaluated as follows. Polystyrene beads (having sizes of 20 to 80 nm) were sprinkled on the vibrating plate 20 that was positioned horizontally in an environment at room temperature and at a humidity of 50% rh. After the beads were left on the vibrating plate 20 for an hour, the vibrating plate 20 was oriented vertically and was driven. Then, the change in the quantity of beads on the vibrating plate 20 between that before the driving and that after the driving was observed on the image basis. The dust removal performance was evaluated according to four levels: level 1 corresponding to a removal rate of 90.0% or lower, level 2 corresponding to a removal rate of 98.0% or lower, level 3 corresponding to a removal rate of 99.9% or lower, and level 4 corresponding to a removal rate of 100%. That is, the greater the number representing the level of evaluation, the higher the performance of the dust removing device 10. The dust removal performance was taken as the average of ten trials of the above test.

In Working Example 1, the removal driving operations A to D were sequentially performed once each (for a duration of one second or less for each driving operation). As a result, the smallest amplitude of vibration observed in the optically effective area was 1.10 μm, and the level of dust removal performance was 4.

Working Example 2

A dust removing device 10 configured as illustrated in FIG. 1 was prepared by using the same vibrating plate 20 and the same piezoelectric elements 30 as those used in Working Example 1 and such that the distances dL each became λ/8. In Working Example 2, dL=dL1=dL2. As with Working Example 1, the removal driving operations A to D were performed sequentially. As with Working Example 1, a bending vibration mode of the nineteenth order was generated when the phase difference was 0, and a bending vibration mode of the eighteenth order was generated when the phase difference was π. In Working Example 2, the smallest amplitude of vibration observed in the optically effective area was 0.80 μm, and the level of dust removal performance was 3.

Working Example 3

Figure 6:
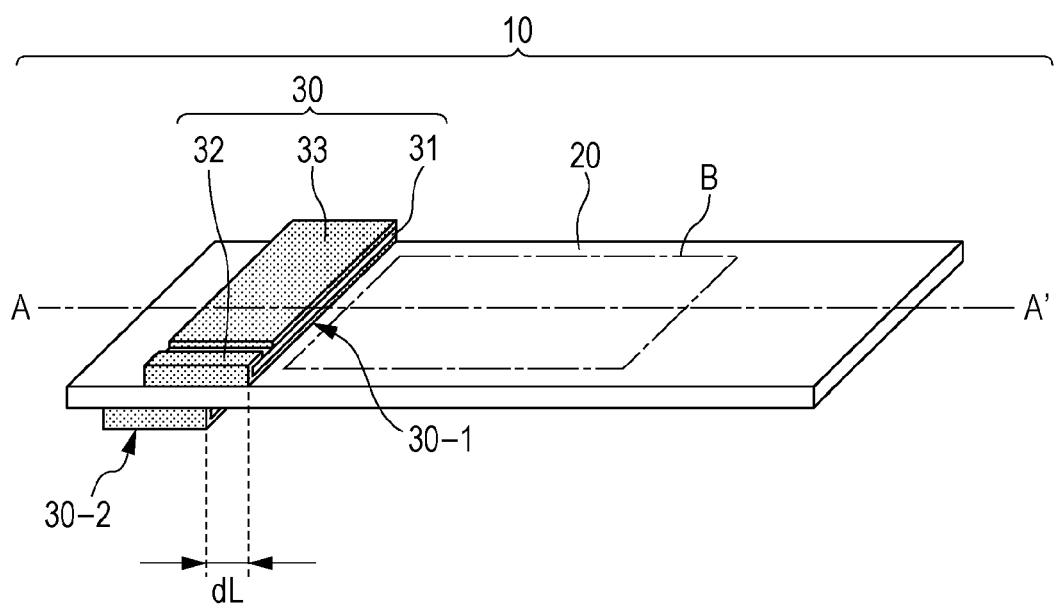
FIG. 6 is a schematic diagram of a dust removing device according to Working Example 4 of the present invention.

A dust removing device 10 configured as illustrated in FIG. 6 was prepared by using the same vibrating plate 20 and the same piezoelectric elements 30 as those used in Working Example 1 and such that the distance dL became λ/4. Removal driving operations were performed as follows. The alternating voltage of the same value and at the same frequency as those defined for the removal driving operation A performed in Working Example 1 was applied first to the piezoelectric element 30-1 and then to the piezoelectric element 30-2 once each (for a duration of one second or less). That is, the alternating voltage was applied to the two piezoelectric elements 30-1 and 30-2 sequentially at different timings. In Working Example 3, a bending vibration mode of the nineteenth order was generated both in the application of the alternating voltage to the piezoelectric element 30-1 and in the application of the alternating voltage to the piezoelectric element 30-2. In Working Example 3, the smallest amplitude of vibration observed in the optically effective area was 0.80 μm, and the level of dust removal performance was 3.

Working Example 4

A dust removing device 10 configured as illustrated in FIG. 6 was prepared by using the same vibrating plate 20 and the same piezoelectric elements 30 as those used in Working Example 1 and such that the distance dL became λ/8. Removal driving operations were performed as follows. The alternating voltage of the same value and at the same frequency as those defined for the removal driving operation A performed in Working Example 1 was applied first to the piezoelectric element 30-1 and then to the piezoelectric element 30-2 once each (for a duration of one second or less). That is, the alternating voltage was applied to the two piezoelectric elements 30-1 and 30-2 sequentially at different timings. In Working Example 4, a bending vibration mode of the nineteenth order was generated both in the application of the alternating voltage to the piezoelectric element 30-1 and in the application of the alternating voltage to the piezoelectric element 30-2. In Working Example 4, the smallest amplitude of vibration observed in the optically effective area was 0.44 μm, and the level of dust removal performance was 2.

Working Example 5

Figure 7:
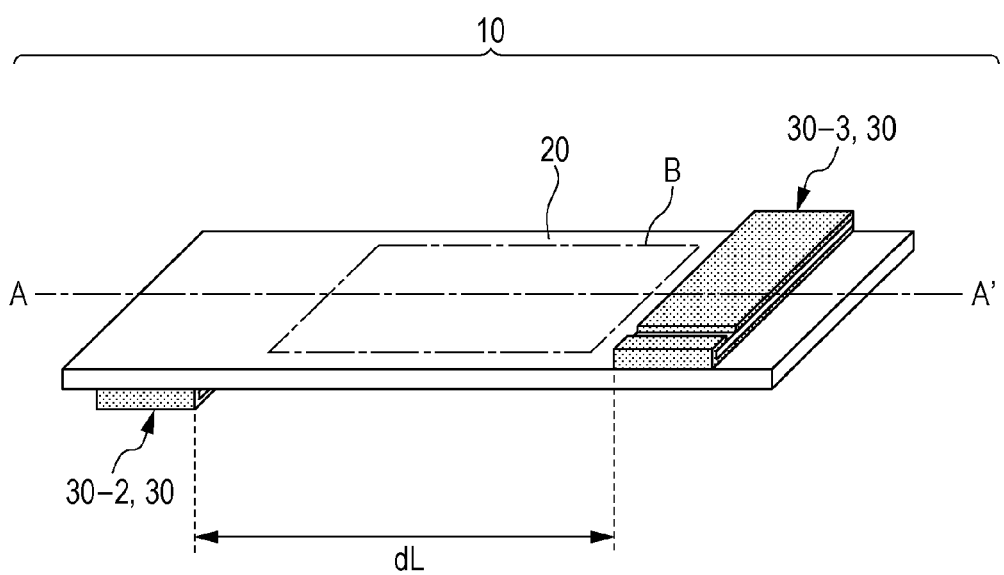
FIG. 7 is a schematic diagram of a dust removing device according to Working Example 5 of the present invention.

A dust removing device 10 configured as illustrated in FIG. 7 was prepared by using the same vibrating plate 20 and the same piezoelectric elements 30 as those used in Working Example 1 and such that the distance dL became nλ/4, where n was a positive integer, more specifically, n was 26. Furthermore, the optically effective area had a width of 30 mm or larger. Removal driving operations were performed as follows. The alternating voltage of the same value and at the same frequency as those defined for the removal driving operation A performed in Working Example 1 was applied first to the piezoelectric element 30-2 and then to the piezoelectric element 30-3 once each (for a duration of one second or less). That is, the alternating voltage was applied to the two piezoelectric elements 30-2 and 30-3 sequentially at different timings. In Working Example 5, the piezoelectric element 30-3 functioned as the first piezoelectric element, and the piezoelectric element 30-2 functioned as the second piezoelectric element. In Working Example 5, a bending vibration mode of the nineteenth order was generated both in the application of the alternating voltage to the piezoelectric element 30-2 and in the application of the alternating voltage to the piezoelectric element 30-3. In Working Example 5, the smallest amplitude of vibration observed in the optically effective area was 0.46 µm, and the level of dust removal performance was 2.

Working Example 6

Figure 11:
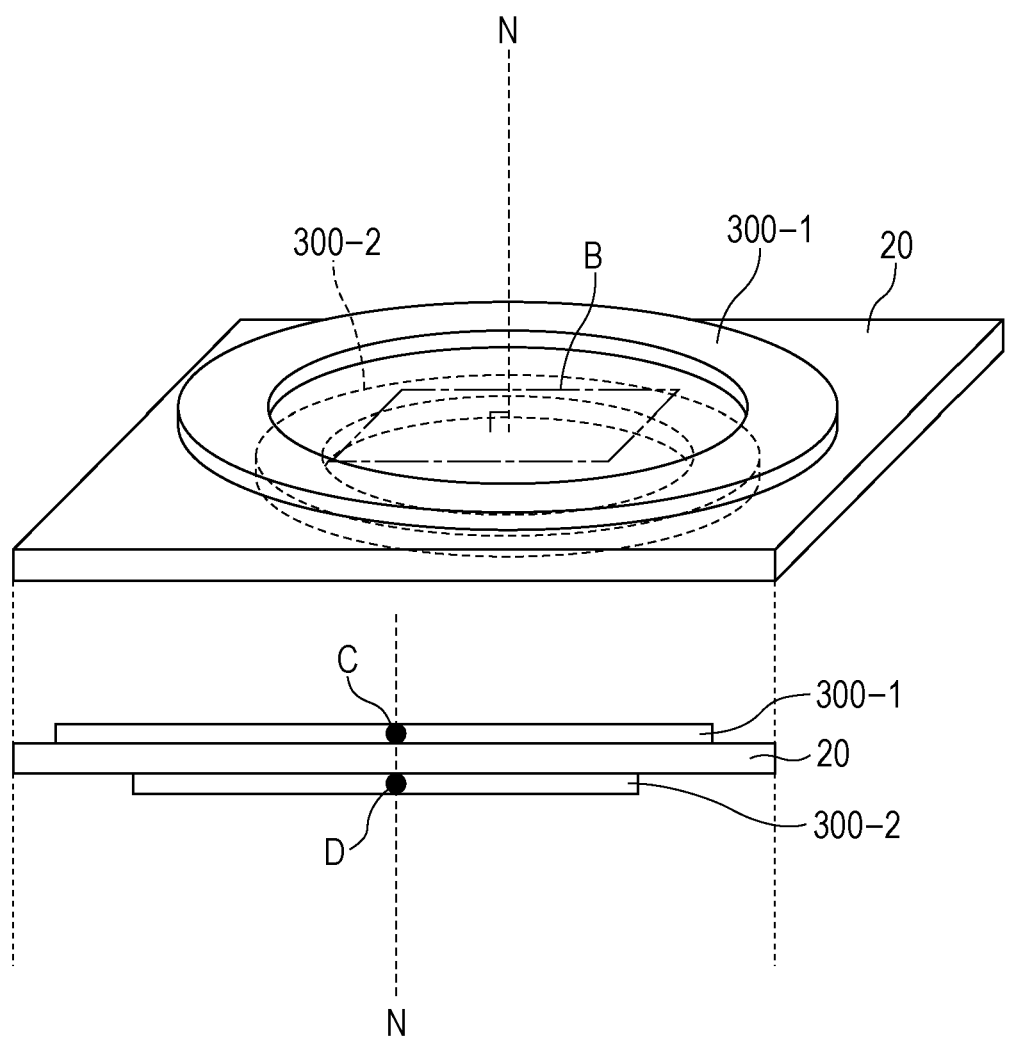
FIG. 11 is a schematic diagram of a dust removing device according to Working Example 6 of the present invention.

A dust removing device configured as illustrated in FIG. 11 was prepared by using a vibrating plate 20 that was a glass plate functioning as an infrared cut filter and of size 62.8 mm (width)×45.7 mm (length)×0.3 mm (thickness). Piezoelectric elements 300-1 and 300-2 were made of the same material as that used in Working Example 1. The piezoelectric element 300-1 had an outside diameter of 50.0 mm, an inside diameter of 46.0 mm, and a thickness of 0.25 mm. The piezoelectric element 300-2 had an outside diameter of 38.0 mm, an inside diameter of 34.0 mm, and a thickness of 0.25 mm (electrodes are not illustrated). As illustrated in FIG. 11, the piezoelectric elements 300-1 and 300-2 were arranged such that, when projected in a direction of a line N that is normal to the vibrating plate 20, a center C of the inner circumference of the piezoelectric element 300-1 that was in contact with the vibrating plate 20 coincided with a center D of the inner circumference of the piezoelectric element 300-2 that was in contact with the vibrating plate 20. Removal driving operations were performed as follows. The same alternating voltage as that defined for the removal driving operation A performed in Working Example 1 was applied first to the piezoelectric element 300-1 and then to the piezoelectric element 300-2 once each (for a duration of one second or less). In Working Example 6, the smallest amplitude of vibration observed in the optically effective area was 0.78 µm, and the level of dust removal performance was 3.

Working Example 7

A dust removing device 10 configured as illustrated in FIG. 1 was prepared by using the same vibrating plate 20 and the same piezoelectric elements 30 as those used in Working Example 1 and such that the distances dL became λ/16. As with Working Example 1, the removal driving operations A to D were performed sequentially. In Working Example 7, the smallest amplitude of vibration observed in the optically effective area was 0.40 µm, and the level of dust removal performance was 2.

Working Example 8

A dust removing device 10 configured as illustrated in FIG. 1 was prepared by using the same vibrating plate 20 and the same piezoelectric elements 30 as those used in Working Example 1 and such that the distances dL became λ/4. The removal driving operations A and B were performed sequentially. In Working Example 8, the smallest amplitude of vibration observed in the optically effective area was 1.00 µm, and the level of dust removal performance was 4.

Comparative Example 1

Figure 8:
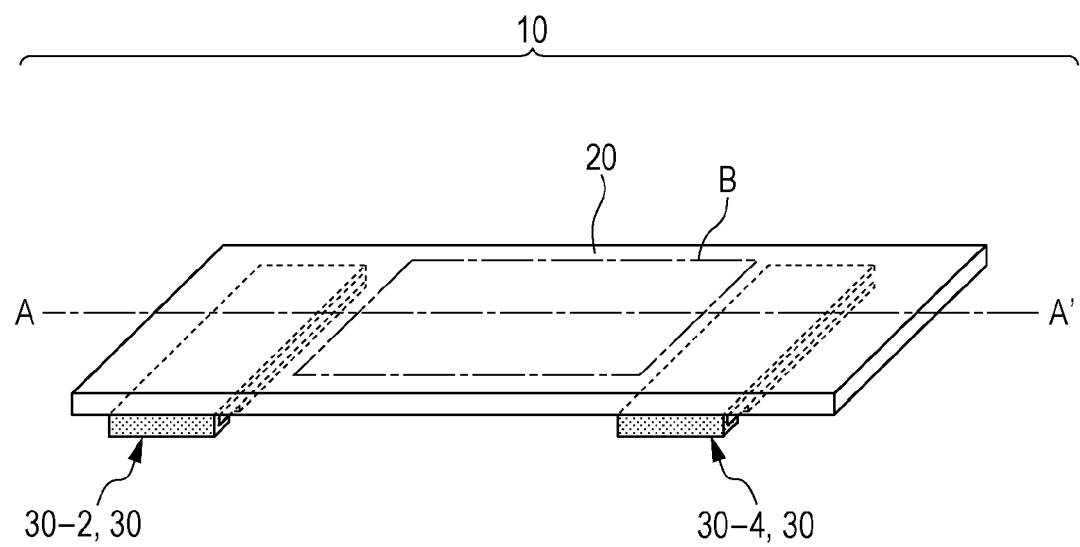
FIG. 8 is a schematic diagram of a dust removing device according to Comparative Example 1 of the present invention.
Figure 9:
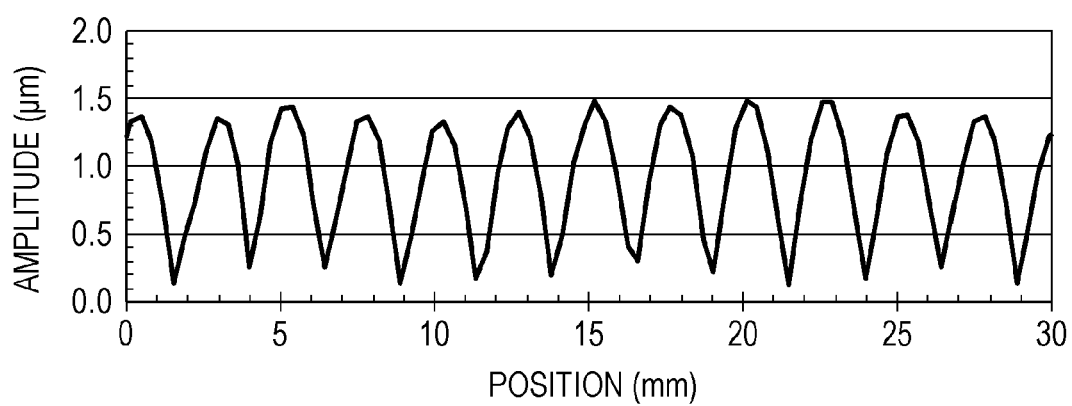
FIG. 9 is a graph illustrating the measured amplitude of vibration generated in the dust removing device according to Comparative Example 1 of the present invention.

FIG. 8 illustrates a dust removing device 10 according to Comparative Example 1. The dust removing device 10 included the same vibrating plate 20 and the same piezoelectric elements 30-2 and 30-4 as those used in Working Example 1. The piezoelectric element 30-2 and the piezoelectric element 30-4 were fixed to one of the flat surfaces of the vibrating plate 20. The target surface B enclosed by the dashdot line corresponds to the optically effective area. The piezoelectric elements 30-2 and 30-4 were arranged such that the optically effective area had a width of 30 mm. The removal driving operation B was performed on the two piezoelectric elements 30-2 and 30-4 illustrated in FIG. 8. FIG. 9 is a graph illustrating the amplitude of vibration observed in the optically effective area of the vibrating plate 20 on a vibration measurement line A-A' illustrated in FIG. 8. The graph in FIG. 9 illustrates the largest amplitude of vibration at each of different positions observed when the removal driving operation B was performed.

The amplitude of vibration became small at the nodes of a standing wave generated when the piezoelectric elements 30 were driven at the resonance frequency, whereas the amplitude of vibration became large at the loops of the standing wave. In Comparative Example 1, the smallest amplitude of vibration observed in the optically effective area was 0.28 µm, and the level of dust removal performance was 1.

Comparative Example 2

Figure 10:
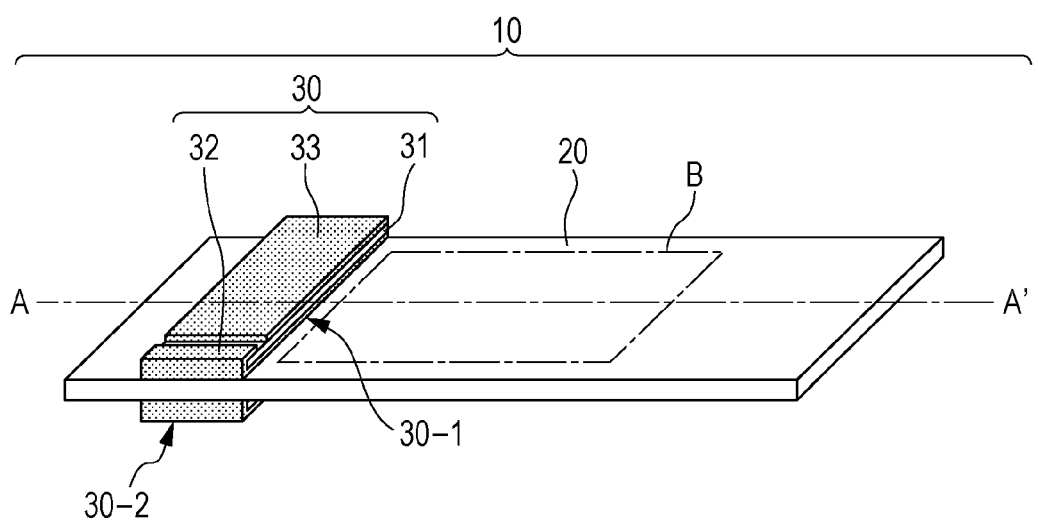
FIG. 10 is a schematic diagram of a dust removing device according to Comparative Example 2 of the present invention.

FIG. 10 illustrates a dust removing device 10 according to Comparative Example 2. In Comparative Example 2, the distance dL was zero, and the same vibrating plate 20 and the same piezoelectric elements 30-1 and 30-2 as those used in Working Example 1 were used. Specifically, the contours of the projections of the piezoelectric element 30-1 and the piezoelectric element 30-2 obtained in the direction that is normal to the vibrating plate 20 conform to each other. Removal driving operations were performed as follows. The same alternating voltage as that defined for the removal driving operation A performed in Working Example 1 was applied first to the piezoelectric element 30-1 and then to the piezoelectric element 30-2 once each (for a duration of one second or less). In Comparative Example 2, the smallest amplitude of vibration observed in the optically effective area was 0.28 µm, and the level of dust removal performance was 1.

Table 1 summarizes the amplitudes of vibration observed in the optically effective area and the levels of dust removal performance in Working Examples 1 to 8 and Comparative Examples 1 and 2.

TABLE 1

| | Smallest amplitude of vibration in optically effective area (µm) | Level of dust removal performance |
|---|---|---|
| Working Example 1 | 1.10 | 4 |
| Working Example 2 | 0.80 | 3 |
| Working Example 3 | 0.80 | 3 |
| Working Example 4 | 0.44 | 2 |

TABLE 1-continued

| | Smallest amplitude of vibration in optically effective area (μm) | Level of dust removal performance |
|---|---|---|
| Working Example 5 | 0.46 | 2 |
| Working Example 6 | 0.78 | 3 |
| Working Example 7 | 0.40 | 2 |
| Working Example 8 | 1.00 | 4 |
| Comparative Example 1 | 0.28 | 1 |
| Comparative Example 2 | 0.28 | 1 |

In addition, dust removing devices having the same configurations as those in Working Examples 1 to 8 and Comparative Examples 1 and 2, except that the piezoelectric material was changed to barium-calcium-titanate ceramic, were prepared as Working Examples 9 to 16 and Comparative Examples 3 and 4, respectively, and were driven in the same manners as those described above. The amplitude of vibration and the level of dust removing performance were also measured in the same manner as those described above for Working Examples 9 to 16 and Comparative Examples 3 and 4. Table 2 summarizes the results of the measurements. The composition of the piezoelectric material was expressed in the form $(Ba_{1-x}Ca_x)_a(Ti_{1-y}Zr_y)O_3$, where x=0.187, y=0.060, and a=1.003. The content of Mn in the piezoelectric material was 0.24 parts by weight per 100 parts by weight of the ceramic.

TABLE 2

| | Smallest amplitude of vibration in optically effective area (μm) | Level of dust removal performance |
|---|---|---|
| Working Example 9 | 1.13 | 4 |
| Working Example 10 | 0.82 | 3 |
| Working Example 11 | 0.82 | 3 |
| Working Example 12 | 0.45 | 2 |
| Working Example 13 | 0.47 | 2 |
| Working Example 14 | 0.80 | 3 |
| Working Example 15 | 0.41 | 2 |
| Working Example 16 | 1.03 | 4 |
| Comparative Example 3 | 0.29 | 1 |
| Comparative Example 4 | 0.29 | 1 |

The piezoelectric material used in Working Examples 9 to 16 and Comparative Examples 3 and 4 was obtained as follows. A polyvinyl-alcohol (PVA) binder was added to mixed powder containing barium titanate (BT-01 from Sakai Chemical Industry Co., Ltd.), calcium titanate (CT-03 from Sakai Chemical Industry Co., Ltd.), calcium zirconate (CZ-03 from Sakai Chemical Industry Co., Ltd.), manganese (Mn) carbonate (MNH06PB from Kojundo Chemical Laboratory Co, Ltd.), and barium oxalate (BAH12XB from Kojundo Chemical Laboratory Co, Ltd.). The resultant matter was compression-molded and was then sintered in an atmosphere at a highest temperature of 1340° C. for five hours. Thus, a ceramic material was obtained.

As summarized above, the dust removing devices according to Working Examples 1 to 16 each exhibited an amplitude of vibration of 0.40 μm or larger and a dust removal rate of 98% or higher, and were thus demonstrated to have superior dust removal performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-101669 filed Apr. 26, 2012, which is hereby incorporated by reference herein in its entirety.

What is claimed is:

1. A dust removing device comprising at least:
a first piezoelectric element and a second piezoelectric element each including a piezoelectric material and electrodes provided on the piezoelectric material; and
a vibrating member on which the first piezoelectric element and the second piezoelectric element are provided,
wherein the dust removing device removes dust from a target surface of the vibrating member by generating vibrations at least at a wavelength λ in the vibrating member by applying alternating voltages to the first piezoelectric element and the second piezoelectric element, respectively,
wherein the first piezoelectric element is provided on a first surface of the vibrating member that is on a side having the target surface, and the second piezoelectric element is provided on a second surface of the vibrating member that is opposite the first surface, and
wherein, when the first piezoelectric element and the second piezoelectric element are projected in a direction that is normal to the target surface, a distance dL1 between a vibration generating end of the first piezoelectric element and a vibration generating end of the second piezoelectric element is expressed in the form dL1>0, where dL1≠nλ/2 and n is a positive integer.

2. The dust removing device according to claim 1,
wherein the target surface is an area of the first surface,
wherein the first piezoelectric element is provided in an area of the first surface that is on the outside of the target surface,
wherein the second piezoelectric element is provided in an area of the second surface that is on the outside of a projection of the target surface obtained in the direction that is normal to the target surface, and
wherein the vibration generating ends of the first and second piezoelectric elements each face the target surface.

3. The dust removing device according to claim 1, wherein the distance dL1 falls within a range of (4n−3)λ/8≤dL1≤ (4n−1)λ/8.

4. The dust removing device according to claim 3, wherein the distance dL1 is λ/4.

5. The dust removing device according to claim 1, further comprising a control unit configured to apply the alternating voltages to the first and second piezoelectric elements,
wherein the alternating voltages are at the same frequency and are applied to the first piezoelectric element and the second piezoelectric element at different timings.

6. The dust removing device according to claim 1, further comprising a control unit configured to apply the alternating voltages to the first and second piezoelectric elements,
wherein the alternating voltages are at different frequencies and are applied to the first piezoelectric element and the second piezoelectric element sequentially at different timings.

7. The dust removing device according to claim 1, further comprising a control unit configured to apply the alternating voltages to the first and second piezoelectric elements,
wherein the control unit performs
a control operation in which alternating voltages that are at the same frequency and are in phase are applied to the first piezoelectric element and the second piezoelectric element, respectively, and
a control operation in which alternating voltages that are at the same frequency and are in opposite phases are applied to the first piezoelectric element and the second piezoelectric element, respectively.

8. The dust removing device according to claim 1, further comprising:
a third piezoelectric element provided on the first surface and a fourth piezoelectric element provided on the second surface,
wherein, when the third piezoelectric element and the fourth piezoelectric element are projected in the direction that is normal to the target surface, a distance dL2 between a vibration generating end of the third piezoelectric element and a vibration generating end of the fourth piezoelectric element is expressed in the form dL2>0, where dL2≠nλ/2 and n is a positive integer.

9. The dust removing device according to claim 8,
wherein the target surface is an area of the first surface,
wherein the first and third piezoelectric elements are provided in respective areas of the first surface that are on the outside of the target surface,
wherein the second and fourth piezoelectric elements are provided in respective areas of the second surface that are on the outside of a projection of the target surface obtained in the direction that is normal to the target surface, and
wherein the vibration generating ends of the first to fourth piezoelectric elements each face the target surface.

10. The dust removing device according to claim 8, wherein the distance dL2 falls within a range of (4n−3)λ/8≤dL2≤(4n−1)λ/8.

11. The dust removing device according to claim 10, wherein the distance dL2 is λ/4.

12. The dust removing device according to claim 9, further comprising a control unit configured to apply the alternating voltages to the first to fourth piezoelectric elements,
wherein the control unit performs
a first control operation in which alternating voltages that are at a first frequency and are in phase are applied to the first piezoelectric element and the third piezoelectric element, respectively;
a second control operation in which alternating voltages that are at the first frequency and are in phase are applied to the second piezoelectric element and the fourth piezoelectric element, respectively;
a third control operation in which alternating voltages that are at the first frequency and are in opposite phases are applied to the first piezoelectric element and the third piezoelectric element, respectively; and
a fourth control operation in which alternating voltages that are at the first frequency and are in opposite phases are applied to the second piezoelectric element and the fourth piezoelectric element, respectively, and
wherein the first to fourth control operations are performed at different timings.

13. The dust removing device according to claim 1, wherein at least the piezoelectric materials of the first and second piezoelectric elements are each chiefly composed of a perovskite-type metal oxide that is expressed by the following general formula:

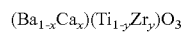

$(Ba_{1-x}Ca_x)(Ti_{1-y}Zr_y)O_3$ where $0.02 \leq x \leq 0.30$, $0.020 \leq y \leq 0.095$, and $y \leq x$.

14. The dust removing device according to claim 13,
wherein the metal oxide contains Mn, and
wherein the content of Mn on a metal basis is 0.02 parts by weight or greater and 0.40 parts by weight or less per 100 parts by weight of the metal oxide.

15. An image pickup apparatus comprising at least:
the dust removing device according to claim 1; and
a light receiving element,
wherein the vibrating member and a light receiving surface of the light receiving element are provided coaxially such that light transmitted through the vibrating member of the dust removing device is incident on the light receiving surface.

* * * * *